Jan. 28, 1936.  I. H. NOELL ET AL  2,029,249
MOBILE GROUND WORKING DEVICE
Filed June 1, 1935  2 Sheets-Sheet 2
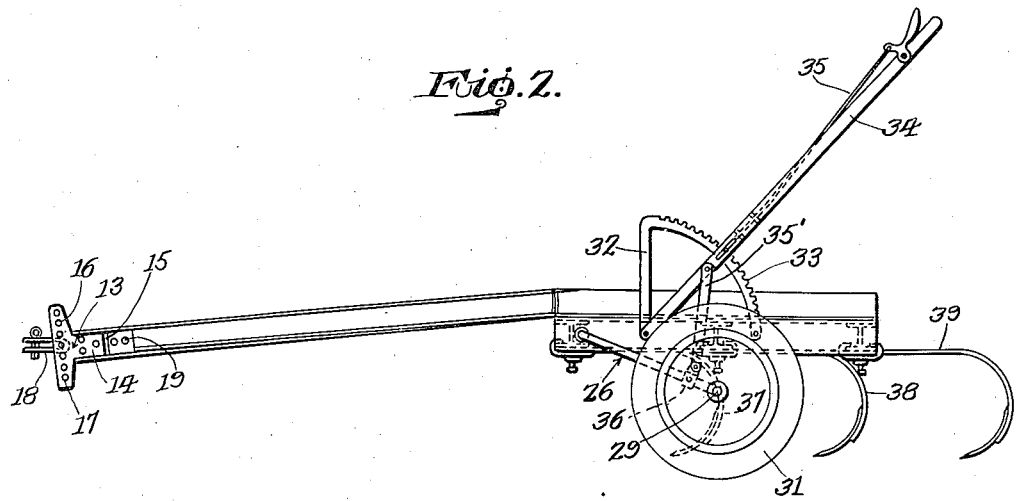
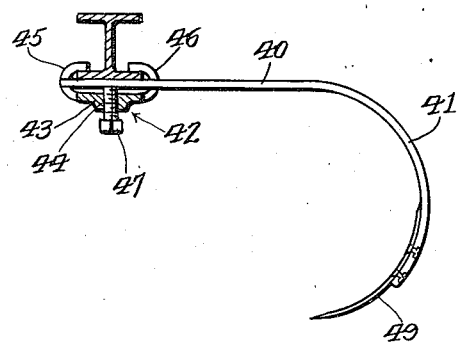
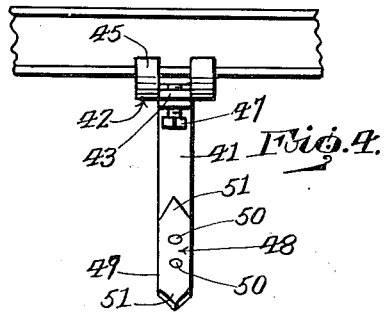
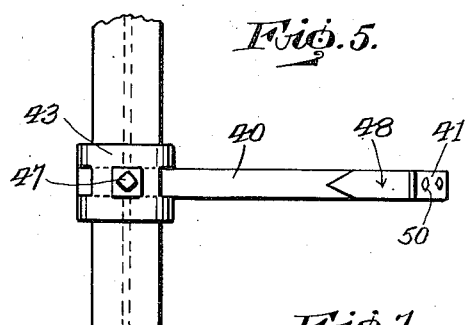
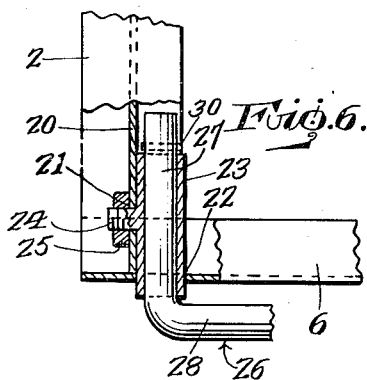
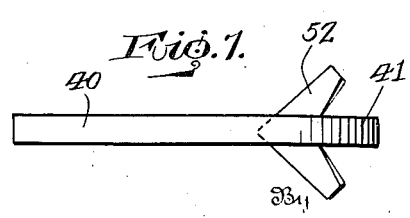
Inventors
Isome H. Noell
Fred W. Hoeme
Geo. P. Kimmel
Attorney Patented Jan. 28, 1936

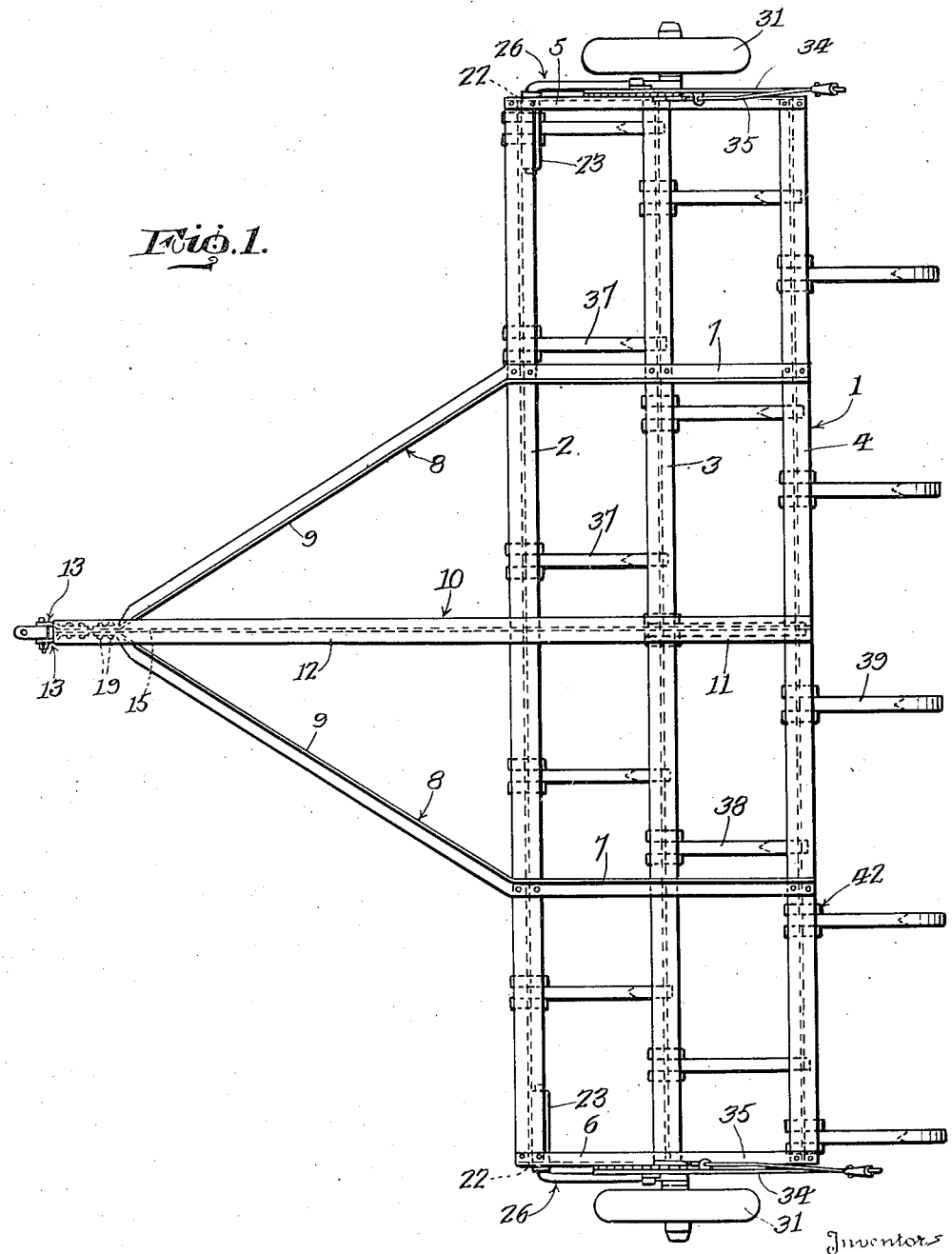

2,029,249

UNITED STATES PATENT OFFICE 2,029,249

MOBILE GROUND WORKING DEVICE

Isome H. Noell and Fred W. Hoeme, Hooker, Okla.

Application June 1, 1935, Serial No. 24,553

1 Claim. (Cl. 97—198.1)

This invention relates to a mobile ground working device such as a shovel, plow or cultivator and is adapted for use in either preparing the ground for crop or cultivating and protecting crop after planting.

The object of the invention is to provide, in a manner as hereinafter set forth, a thoroughly efficient device of the class referred to for stirring, digging out and throwing up a moist and heavier sub-soil that is not eroded and dry to create a ridged surface of a corrugated nature to avoid wind erosion and to form a sub-surface to gather and preserve moisture; for acting upon the land to insure fertilization thereto and to provide a mixture of soils when the land is combined of sand loam surfaces, clay or similar sub-surface soils; for mixing and stimulating the soils when the soils and sub-soils are of a like nature; for acting upon the land to create deep sub-surfaces and surface ridges to protect the land from soil erosion, either by wind or water.

A further object of the invention is to provide, in a manner as hereinafter set forth, a ground working device for efficient use on ordinary prairie land, wheat, corn, cotton or other row-crop where standard rows of crop are to be planted, or land prepared for planting or when cultivation of land is desired that is planted, or when cleaning, cultivating and weeding of growing crop is desired; as well as to cultivate, stir and ridge sub-soil and clean the ground; for throwing up spaced ridges on the surfaces of the field to prevent soil erosion, either by water or wind; and creating sub-surface furrows of any desired depth that tends to catch and attract drainage of surface moistures to be retained in such sub-surface furrows, thus preserving and checking the sub-drainage on flat or rolling land.

A further object of the invention is to provide, in a manner as hereinafter set forth, a device of the class referred to including a cushioned mobile structure provided with resilient curved beams for supporting and carrying the ground working tools.

A further object of the invention is to provide, in a manner as hereinafter set forth, a device of the class referred to including vertically adjustable traction wheels of the cushioned type for supporting the body or frame of the device to which the beams for the ground work tools are attached.

A further object of the invention is to provide, in a manner as hereinafter set forth, a device of the class referred to including a set of resilient beams carrying ground working tools and means for adjustably connecting the beams of each set to a support therefor.

Further objects of the invention are to provide, in a manner as hereinafter set forth, a device for the purpose set forth which is simple in its construction and arrangement, strong, durable, compact, thoroughly efficient in use for the purpose intended thereby, conveniently repaired, readily assembled and comparatively inexpensive to manufacture.

With the foregoing and other objects in view which may hereinafter appear, the invention consists of such parts and such combination of parts as will be specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a top plan view of the device,

Figure 2 is a side elevation thereof,

Figure 3 is a side view of the form of resilient beam employed for carrying a ground work tool and further showing the means for clamping the beam to the body part of the device, Figure 4 is a front elevation of the beam as anchored and carrying a ground working tool, Figure 5 is an inverted plan view of the beam as anchored and carrying a grounding tool, Figure 6 is a fragmentary view in plan illustrating the coupling connection between the traction wheel hanger and the body part of the device, and Figure 7 is a top view of the beam having attached thereto a modified form of ground working tool.

The device includes a flat, rectangular body part I of frame-like form including front, intermediate and rear body bars 2, 3, 4 respectively and a pair of side bars 5, 6. The bars 2, 3, 4 are in the form of I-beams, of like length and are arranged in parallel spaced relation. As is well known, an I-beam includes two opposed spaced parallel pairs of oppositely extending flanges and a web, and with the web merging into the said pairs of flanges. The I-beams employed in the body part I are disposed to provide a pair of oppositely extending flanges at their tops and bottoms. The bars 5, 6 are in the form of channel irons, overlap the top and bottom of, are suitably connected to and are of less length than that of bars 2, 3, 4.

Mounted upon the bars 2, 3, 4, between the transverse median and each end thereof, is the rear part 7 of an angle bar 8. The forward part of the latter, indicated at 9, extends at an inclination towards the transverse median of body part 1. The bars 8 are oppositely disposed. The bars 8 are suitably secured to the top of body part 1. The bars 8 brace body part 1 and also act as bracing means for a hitch 10 consisting of a rear part 11 and a forward part 12. The hitch 10 is in the form of an I-beam. The part 11 is mounted upon and suitably secured to the body part 1 at the transverse median of the latter. The forward part 12 of hitch 10 is disposed at a downward inclination (Figure 2) with respect to rear part 11 and has arranged at and extending forwardly from its outer end a pair of parallel apertured spaced T-shaped members 13. The stems 14 of members 13 are arranged against opposite sides of and secured to the web 15 of hitch 10. The heads 16 of members 13 have superposed aligning apertures 17 for adjustably connecting thereto a clevis 18. The forward ends of the parts 9 of the bars 8 are secured to opposite sides of and in proximity to the forward end of web 15 by the holdfast means 19.

The web of bar 2 is indicated at 20 and is provided, in proximity to each end thereof, with an opening 21. Only one of the openings 20 is shown and in this connection see Figure 6. The bars 5, 6, in proximity to their forward ends, are provided with openings 22. Arranged against the rear face of web 20 are spaced endwise aligning sleeves 23 which project from the ends of bar 2. The sleeves 23 are formed with forwardly extending peripherally threaded protuberances 24, only one shown, which pass through openings 21 in web 20. Engaging with the protuberances 24 and abutting web 20 are securing nuts 25 which clamp sleeves 23 against web 20. The sleeves 23 provide bearings for oppositely disposed wheel hanger 26 of like form. Each hanger includes a horizontally disposed inner arm 27 and a rearwardly directed downwardly inclined outer arm 28 terminating in an outwardly directed axle or spindle 29 disposed at right angles to arm 28. The arms 27 are rotatably mounted in and are of greater length than that of the sleeves 23. The arms 27, in proximity to their inner ends, carry stop pins 30 disposed diametrically and extending laterally in opposite directions therefrom. The pins 30 coact with the inner ends of sleeves 23 for coupling the hangers 26 to the body part 1. Mounted on the axles or spindles 29 are traction wheels 31 of the cushioned tired type. The wheels 31 are retained on the axles 29 by any suitable means.

The arms 27 of the hangers 26 are vertically adjustable for the purpose of elevating and lowering the wheels 31 to vary the distance between body part 1 and the ground. The arms 27, when adjusted, are latched in such position with body part 1. For this purpose the side bars 5, 6 have secured thereto the lower ends of vertically disposed bars 32 terminating at their upper ends into rearwardly extending upstanding quadrant-shaped racks 33 anchored at their lower ends to bars 5, 6. Pivotally mounted at their lower ends, upon the securing means for the bars 32, are upstanding rearwardly extending adjustable hand levers 34 carrying pawl and lever mechanisms 35 for coaction with the racks 33 for the purpose of latching levers 34 in adjusted position. Pivotally connected to the levers 34 are the upper ends of depending links 35' which are pivotally connected at their lower ends to yokes 36 fixed to the arms 27.

Adjustably connected to the bars 2, 3, 4 are sets 37, 38, 39 respectively of rearwardly directed lengthwise adjustable resilient beams or tool standards. Each beam is of like form and consists of a resilient strap of metallic material formed of a horizontal disposed straight upper part 40 terminating into a depending rear part 41 of arcuate curvature. The beams of a leading set are staggered with respect to the beams of a follower set. A clamping device 42 is employed for connecting the forward end terminal portion of the part 40 of a beam to a body bar 2, 3 or 4 and which may be positioned at any desired point lengthwise of the bar. Each clamping device 42 includes a base 43 having an axially arranged vertically disposed threaded opening 44, a pair of spaced horizontally disposed semi-oval shaped clamping arms 45 at the front of the base 43, a pair of spaced horizontally disposed semi-oval shaped clamping arms 46 at the rear of the base 43, and a vertically adjustable clamping screw 47 engaging with the wall of opening 44. The base 43 is in the form of a rectangular plate having its lengthwise edges aligned with the lengthwise edges of the base flanges of a body bar. The arms 45 are directed forwardly with respect to base 43 and the forward base flange of a body bar and then rearwardly inturned to overlap such flange. The arms 45 are directed rearwardly with respect to base 43 and the rearward base flange of a body bar and then forwardly inturned to overlap the said rear base flange. The upper portion of the arms 45 are oppositely disposed with respect to the upper portion of the arms 46, that is to say, the upper portion of the arms 45 extend rearwardly and the upper portion of the arms 46 extend forwardly. When a beam is secured to a bar 2, 3 or 4, the forward end of the upper part 40 of the beam is passed between the arms of the pairs of clamping arms and positioned between base 43 and bottom of the body bar. This arrangement of beam is had after the clamping device has been mounted upon the oppositely extending base flanges of the body bar. When part 40 has been arranged in the position stated, the clamping screw 47 is screwed home whereby the beam is tightly clamped against the lower face of the body bar, and in this connection reference is had to Figure 3.

The ground working tools shown in Figures 1 to 5 are of the same construction and indicated at 48. Each tool 48 performs a plowing function and is formed from a strap 49 of metallic material corresponding in width to that of part 41 of a beam. The strap 49 is of arcuate curvature and has its upper portion seated against the lower portion of the forward face of part 41. The lower portion of strap 49 extends forwardly from the lower end of part 41. The strap 49 is secured to part 41 by countersunk holdfast means 50. The upper and lower ends of strap 49 are tapered, as at 51.

Sweeps 52 (Figure 7) may be attached to the beams 37, 38, 39 instead of shovels, plows or diggers for use in shallow work, weeding, etc.

The adjustable spring beams to which the ground working tools are attached are such that either end of the plow may be used. The spring beams are adjustable forward and rearward in the clamps according to the soil being worked—the full length extension being more desirable and practical in hard or tight land and the shorter adjustment being best suitable for light or loose soil (ordinarily such principle would be the reverse with any other kind of plow) as the long adjustments permit individual position of the tool in hard ground when contacting sub-surface rocks, harder streaks of dirt, etc., causing each to rise slightly, shift and dodge in the contact of such objects without in any way interferring with the other spring beams and tools by reason of the quality of steel in the beams, the heavy balanced weight of the frame and the submerged tools on the other spring beams in the soil, thus the whole prevents any side draft of the whole machine. Experience in economy of operation shows ground can be gone over with this set of tools as much as three times at the same expense of once over with the common one-way plow now in use in the Western country, being only a surface plow.

Each clamping arm is an integral continuation of a side edge of the base 43. Each clamping arm includes a lower stretch which merges at its inner end into an edge of the base 43 and merges at its outer end into the lower end of an upstanding inwardly directed curved bend. The upper end of the bend merges into the outer end of an inwardly extending upper stretch overlapping and slidable upon a base flange. The inner edges of the bends of each pair of arms provide abutments for the edges of the upper end terminal portion of the beam carrying the ground working tool.

What we claim is:

In a ground working device, a mobile I-beam, a resilient beam having a horizontally disposed part and a part depending from the rear end of the horizontally disposed part for carrying a ground working tool, said horizontal part extending rearwardly from said I-beam and having a portion thereof positioned transversely of the bottom of the I-beam, a base member arranged against the lower face of the said portion and being formed with a vertically disposed opening having a threaded wall, oppositely disposed upstanding clamping means at the front and rear of said base member and overlapping the lengthwise edges of the base flanges of said I-beam, and adjustable means threadedly engaging with the wall of said opening, abutting said portion and coacting with said clamping means for clamping said horizontal part against the bottom flanges of the I-beam, the said clamping means at the front and at the rear of said base member being in the form of a pair of spaced parallel curved arms of like form, the inner side edges of the arms of each pair abutting the lengthwise edges of said horizontal part.

ISOME H. NOELL.
FRED W. HOEME.